United States Patent
Chang et al.

(10) Patent No.: US 7,577,411 B2
(45) Date of Patent: Aug. 18, 2009

(54) MOBILE STATION ACCESS AND IDLE STATE ANTENNA TUNING SYSTEMS AND METHODS

(75) Inventors: Henry Chang, San Diego, CA (US); Gregory Poilasne, San Diego, CA (US); Jorge Fabrega-Sanchez, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 484 days.

(21) Appl. No.: 11/062,242

(22) Filed: Feb. 17, 2005

(65) Prior Publication Data

US 2006/0183443 A1 Aug. 17, 2006

(51) Int. Cl.
*H04B 1/18* (2006.01)
(52) U.S. Cl. ............... 455/193.1; 455/248.1; 455/125
(58) Field of Classification Search ............ 455/193.1, 455/248.1, 125, 233, 1, 82, 129, 121, 180.3
See application file for complete search history.

(56) References Cited

U.S. PATENT DOCUMENTS

| | | | |
|---|---|---|---|
| 5,103,459 A | 4/1992 | Gilhousen et al. | |
| 5,982,759 A | 11/1999 | Jo et al. | |
| 6,052,566 A | 4/2000 | Abramsky et al. | |
| 6,064,868 A | 5/2000 | Kobayashi | |
| 6,070,075 A | 5/2000 | Kim | |
| 6,144,650 A | 11/2000 | Watanabe et al. | |
| 6,188,906 B1 | 2/2001 | Lim et al. | |
| 6,198,441 B1 | 3/2001 | Okabe et al. | |
| 6,298,051 B1 | 10/2001 | Odenwalder et al. | |
| 6,492,942 B1 * | 12/2002 | Kezys ........................ 342/368 |
| 6,657,595 B1 | 12/2003 | Phillips et al. | |
| 6,710,651 B2 | 3/2004 | Forrester | |
| 6,714,526 B2 | 3/2004 | Wei et al. | |
| 6,741,861 B2 | 5/2004 | Bender et al. | |
| 6,754,251 B1 | 6/2004 | Sriram et al. | |
| 6,785,249 B2 | 8/2004 | Soliman | |
| 6,788,685 B1 | 9/2004 | Holtzman et al. | |
| 6,862,432 B1 | 3/2005 | Kim | |
| 6,993,297 B2 * | 1/2006 | Smith, Jr. .................... 455/82 |
| 7,047,046 B2 * | 5/2006 | Hoffmann et al. ......... 455/562.1 |
| 7,058,400 B2 * | 6/2006 | Brooks ....................... 455/424 |
| 2004/0009754 A1 | 1/2004 | Smith, Jr. | |
| 2004/0252724 A1 | 12/2004 | Jou | |
| 2005/0007291 A1 | 1/2005 | Fabrega et al. | |

FOREIGN PATENT DOCUMENTS

KR  2001-011282  2/2001

* cited by examiner

*Primary Examiner*—Edward Urban
*Assistant Examiner*—Christian A Hannon

(57) ABSTRACT

Wireless communication device tuning an antenna matching circuit responsive to a receive signal quality indicator and, optionally, responsive to a failed access probe is provided. Systems and methods are provided that increase the antenna efficiency in either the transmit frequency or the receive frequency in an idle or access state as needed, based on fading conditions, non-ideal antenna efficiency balance, mobile station forward versus reverse link usage and system forward versus reverse link usage. The antenna efficiency may be changed incrementally or may be optimized completely for the transmit frequency or the receive frequency. The re-balancing is accomplished by tuning the antenna matching circuit. One way to tune the antenna matching circuit is to apply a voltage to a ferro-electric capacitor in the matching circuit, thereby changing the capacitance of the ferro-electric capacitor, thereby changing the impedance of the matching circuit.

16 Claims, 2 Drawing Sheets

MOBILE STATION ACCESS AND IDLE STATE ANTENNA TUNING SYSTEMS AND METHODS

BACKGROUND OF THE INVENTION

1. Field of the Invention

The invention relates generally to wireless electronic communications and more particularly to antenna tuning systems and methods.

2. Background

In a communication system with different transmit and receive frequencies, mobile station antenna efficiency is a balance between optimization for the transmit frequency and optimization for the receive frequency. Under typical operating conditions, the typical antenna efficiency balance allows for the best use of the transmit and receive resources. However, commonly, conditions occur in which the typical antenna efficiency balance is not preferred. In such conditions, it can be said that the forward and reverse link are not balanced.

The forward link is the communication link for data (voice data or other data) travelling from a base station transmitter to a mobile station receiver. The reverse link is the communication link for data (voice data or other data) from the mobile station transmitter to the base station receiver.

A first example of a forward and reverse link imbalance is when fading conditions may reduce either the forward link or the reverse link reception. In a second example, the antenna efficiency balance between the transmit and receive frequencies may not be ideal, as a result of some slowly changing parameter or even as a result of a fixed parameter. For example, the antenna matching circuit, or some other hardware component, may have been manufactured or calibrated in a way that provides a non-ideal balance between the transmit and receive frequencies. Alternatively, the antenna efficiency balance may become non-ideal under certain temperature conditions, such as, for example, when high temperatures result from extended continuous use.

In a third example, the typical antenna efficiency balance may not be preferred because of the forward and reverse link loading of the communication system at a particular time. For example, the mobile station may be transmitting or receiving only for some time periods. As another example, the wireless communication system may be overloaded in the forward link relative to the reverse link at a particular time. The communication system might be overloaded in the forward link if, for example, data is being transmitted from a base station simultaneously to many users, but relatively few users are transmitting data to the base station.

SUMMARY OF THE INVENTION

Systems and methods are provided for improving an antenna efficiency balance of a mobile station in either the idle or access state. In one case, the antenna efficiency is shifted toward the receive frequency when a receive signal quality indicator, such as, for example, message error rate (MER) or receive signal strength indicator (RSSI) drops below a predetermined threshold. In another case, the antenna efficiency balance is shifted toward the transmit frequency when the receive signal quality indicator is above the threshold and a threshold number of access probes have failed to create a connection or when the receive signal quality indicator is below the threshold, a threshold number of access probes have failed to create a connection and the mobile station is transmitting at its maximum power.

Other aspects, advantages, and novel features of the invention will become apparent from the following Detailed Description, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION

Figure 1:
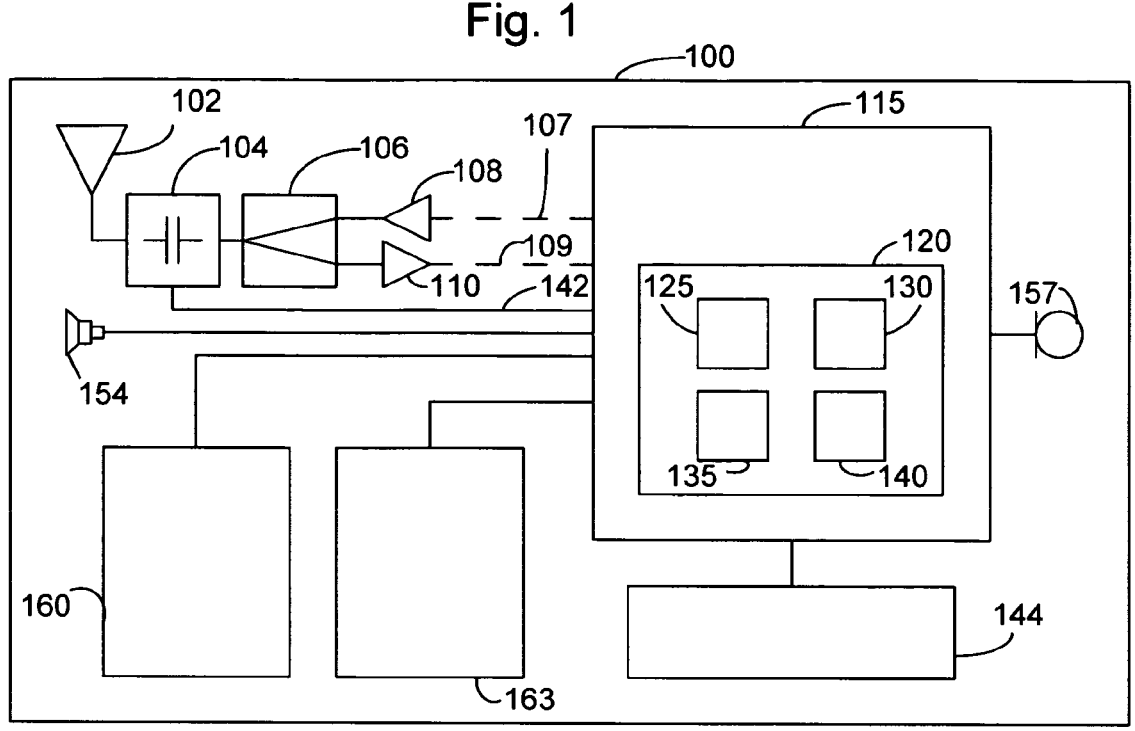
FIG. 1 is a block diagram illustrating a wireless communication device tuning an antenna match.

FIG. 1 is a block diagram illustrating a wireless communication device tuning an antenna match responsive to a received signal quality indicator. Wireless communication device 100 may be a cellular telephone for communicating with a base station, such as, for example, a code division multiple access (CDMA) mobile station. However, wireless communication device 100 may be any wireless communication device that communicates in at least two frequency bands.

Wireless communication device 100 includes antenna 102 for radiating electromagnetic signals into the air and for receiving electromagnetic signals from the air. Only one antenna 102 is shown, though multiple antennas are possible. Antenna 102 is connected to tunable matching circuit 104. Tunable matching circuit 104 may be a ferro-electric tunable matching circuit as described in any of co-pending U.S. patent application Ser. Nos. 10/899,218; 10/899,278; 10/899,285; each filed Jul. 26, 2004; and Ser. No. 10/806,763, filed Mar. 22, 2004, which are each hereby incorporated by reference. Alternatively, tunable antenna matching circuit may be tunable by means of a varactor diode, micro-electrical mechanical switches switching various reactive components in and out of matching circuit 104, or by any other convenient means of tuning matching circuit 104.

Matching circuit 104 is connected to duplexer 106. Duplexer 106 duplexes transmit and receive signals. Alternatively, duplexer 106 could be a switch for duplexing transmit and receive signals. Duplexer 106 is connected to transmit path 107, represented by power amplifier (PA) 108. Duplexer 106 is also connected to receive path 109, represented by low noise amplifier (LNA) 110. Transmit path 107 and receive path 109 are connected to processor 115. Processor 115 may be a Qualcomm™ mobile station modem (MSM), such as a commercially available Qualcomm™ 6000 series MSM, for CDMA communications.

Processor 115 includes controller 120. Processor 115 demodulates the received signal on receive path 109. Power control signals are included in the received signal. That is, a base station (not shown) transmits power control signals to mobile station 100. User interface devices, such as speaker 154, microphone 157, display 160 and keypad 163 are also connected to processor 115.

In one embodiment, the mobile station 100 communicates in an IS-2000 cellular communication system. See TIA/EIA IS-2000, New York, N.Y., USA. In an idle state, mobile station 100 monitors overhead messages and any page for mobile station 100, on a paging channel. From the monitored messages, mobile station 100, that is, processor 115, can determine a message error rate. Also, mobile station 100 monitors RSSI of the forward link pilot channel.

Processor 115 includes controller 120. Controller 120 may include one or more of main input/output table, 125, optimum transmit (Tx) table 130, optimum receive (Rx) table 135, and transmit/receive (Tx/Rx) table 140. Controller 120 uses tables 125, 130, 135 and 140 to control antenna matching circuit 104.

Main input/output table 125, e.g., Table 1, is intended for use in the traffic state, and is included here simply for completeness. Table 1, below, shows examples of transmit gain adjust (TGA) and received signal strength indicator (RSSI) inputs and corresponding antenna matching outputs. There are many other possibilities. Table 1 is shown merely as an example. Particularly, the values in Table 1 may be optimally determined by experiment, and other rows may be added to Table 1 as a result of experimental determinations.

TABLE 1

| TGA | RSSI (dBm) | Output |
|---|---|---|
| >=7 | >−80 | Optimum Tx |
| 5 to 6 | >−85 | Move 3 bins toward Tx |
| 4 | >−85 | Move 2 bins toward Tx |
| 3 | >−85 | Move 1 bin toward Tx |
| −5 to −6 | <−85 | Move 1 bin toward Rx |
| <=−7 | <−90 | Optimum Rx |

Controller 120 keeps track of the sum of all of the transmit gain adjust commands received from the base station. The TGA column of Table 1 shows values of the sum of all of the transmit gain adjust commands. If, for example, TGA is greater than or equal to seven and RSSI is greater than −80 dBm, then the mobile station sets its antenna matching circuit to the optimum Tx setting. The optimum Tx setting is based on the transmit channel being used and the temperature. The optimum transmit setting may be stored in a table like Table 2, below.

TABLE 2

| Channel or Group | Temperature (° C) | Matching Circuit Setting (Volts) |
|---|---|---|
| 1 | <0 | 0.0 |
| 1 | 0 to 35 | 0.12 |
| 1 | 35 to 60 | 0.26 |
| 1 | >60 | 0.52 |
| 2 | <0 | 0.38 |
| 2 | 0 to 35 | 0.50 |
| 2 | 35 to 60 | 0.64 |
| 2 | >60 | 0.80 |

Table 2 is stored in a memory of the mobile station, and referred to whenever called by the output of Table 1. In Table 2, only two transmit channels are shown for illustration. In practice many more channels will be stored. Further, the channel designations shown in Table 2 may not be actual transmit channels. Instead, the channel designations may refer to groups of channels. For example, the lowest 24 channels may be designated as channel (or group) 1 in Table 2. The second group of 24 channels may be designated as channel (or group 2) in Table 2. Thus, the lowest 24 channels may have the same matching circuit setting, for any given temperature.

Thus, to continue the example above, if TGA is 7 and RSSI is greater than −80 dBm, controller 125 determines from Table 1 that optimum Tx setting should be used. Controller looks optimum Tx setting up in Table 2, based on the temperature and the current transmit channel or group of channels. If, for example, the current Tx channel is channel 1 and the current temperature is 30° C., then controller 125 determines, based on Table 2, that the matching circuit setting is 0.12 Volts. Actual values for the matching circuit settings in Tables 2 and 3 will be determined experimentally.

Processor 115 is connected to matching circuit 104 by control line 142. Control line 142 supplies a control voltage to matching circuit 104, such as, for example, 0.12 Volts in the above example. A separate voltage source (not shown) may be provided for supplying the control voltage to matching circuit 104. Or, as shown, the control voltage is supplied by processor 115 directly, responsive to the output of Table 2, 3 or 4, as determined by controller 120.

Controller 120 is shown internal to processor 115. In practice, controller may be external or partially external to processor 115. A separate controller may be provided. For example, a controller may be a separate integrated circuit or may include one or more discrete components. In that case, processor 115 would provide the power control bits or TGA to controller externally. Additionally, RSSI may be provided to controller externally, that is, directly from an RSSI detector (not shown) to controller or from processor to controller.

Processor 115 is connected to memory 144. Tables 1-4 are shown internal to controller 120, which is shown internal to processor 115. Tables 1-4 may be stored in memory 144. Tables 1-4 are shown internal to controller 120 for illustration, since controller uses Tables 1-4 to look up matching circuit settings.

Optimum receive matching circuit settings are stored in memory 144 in a table such as Table 3, below, and referred to whenever the output of Table 1 calls for optimum receive settings.

TABLE 3

| Channel or Group | Temperature (° C) | Matching Circuit Setting (Volts) |
|---|---|---|
| 1 | <0 | 2.0 |
| 1 | 0 to 35 | 2.12 |
| 1 | 35 to 60 | 2.26 |
| 1 | >60 | 2.52 |
| 2 | <0 | 2.38 |
| 2 | 0 to 35 | 2.50 |
| 2 | 35 to 60 | 2.64 |
| 2 | >60 | 2.80 |

Table 3 is stored in a memory of the mobile station, and referred to whenever called by the output of Table 1. In Table 3, only two receive channels are shown for illustration. In practice many more channels will be stored. Further, the channel designations shown in Table 3 may not be actual receive channels. Instead, the channel designations may refer to groups of channels. For example, the lowest 24 channels may be designated as channel (or group) 1 in Table 3. The second group of 24 channels may be designated as channel (or group 2) in Table 3. Thus, the lowest 24 channels may have the same matching circuit setting, for any given temperature.

Another table, such as Table 4, stores matching circuit settings for moving stepwise toward better transmit matching or stepwise toward better receive matching. Stepwise movement is used when the output of Table 1 is something other than Optimize Tx or Optimize Rx. For example, according to Table 1, if TGA is 5 or 6 and RSSI is>85 dBm, then the mobile station tunes the antenna matching circuit 3 steps in the transmit direction (e.g., lower frequency in U.S. CDMA, higher frequency in Japan CDMA). An example Table 4 is shown below. As is the case for Tables 1-3, experiment will give optimum values for Table 4.

TABLE 4

| Bin Number | Matching Circuit Setting (Volts) |
|---|---|
| 1 | 0.0 |
| 2 | 0.13 |
| 3 | 0.26 |
| 4 | 0.38 |
| 5 | 0.50 |
| 6 | 0.62 |
| 7 | 0.73 |
| 8 | 0.83 |

Table 4 does not include temperature as a parameter. Temperature may be included, increasing the complexity and accuracy of Table 4. Further, only eight bins are shown in Table 4. In practice, many more bins are recommended.

The above description was primarily intended for traffic state operation. Idle and access state operation will now be described with respect to Tables 2-4. In the idles state, if the received signal quality indicator is worse than a predetermined threshold, such as one percent for MER or −85 dBm for RSSI, then controller 120 shifts the antenna efficiency toward the Rx frequency. The shift can be an incremental shift as determined by Table 4, or an RX optimum shift as determined by Table 3.

In the access state, if the received signal quality indicator is worse than the predetermined threshold, and less than a threshold number of access probes have been performed, then controller 120 shifts the antenna efficiency toward the Rx frequency. The threshold number of access probes may be three. The shift can be an incremental shift as determined by Table 4, or an Rx optimum shift as determined by Table 3. If the received signal quality indicator is worse than the threshold and the threshold number of access probes has been met, then it may be advantageous for controller 120 to shift the antenna efficiency toward the Tx frequency. However, another check is performed prior to shifting toward the Tx frequency. Controller checks whether the present transmit power is equal to the maximum transmit power. If mobile station 100 is presently transmitting at maximum power, then controller shifts the antenna efficiency toward the transmit frequency. Otherwise, controller 120 does not need to change the antenna efficiency. Mobile station 100 can wait until another access probe is performed. According to TIA/EIA IS-95 or IS-2000, each successive access probe in a series is sent at a greater power than the previous access probe. Thus, it may not be necessary to increase the antenna efficiency in the transmit frequency.

Figure 2:
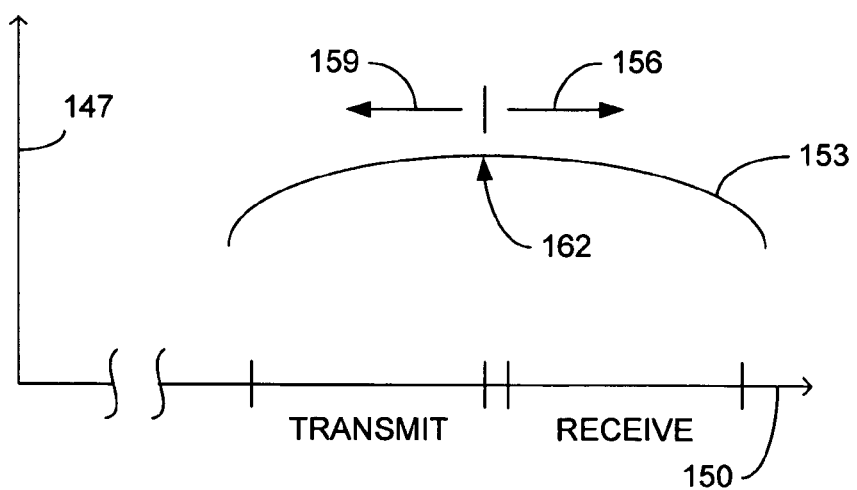
FIG. 2 is a plot illustrating a tunable antenna efficiency.

As described above, controller 120 determines a matching circuit setting for matching circuit 104. FIG. 2 is a plot illustrating a tunable antenna efficiency which can be tuned responsive to the determined matching circuit setting. Antenna efficiency 147 is plotted against frequency 150. An example antenna efficiency 153 is shown as curve 153. Antenna efficiency 153 can be tuned by tuning matching circuit 104. As matching circuit 104 is tuned, curve 153 can be moved to higher or lower frequencies, as shown by arrows 156 and 159. As described in the above referenced copending U.S. patent application Ser. Nos. 10/899,278 and 10/899,218, curve 153 may be tuned to provide maximum efficiency for the currently used transmit and receive channels. Further, curve 153 is tuned responsive to commands from controller 120, based on Tables 2-4.

For example, if controller 120 calls for an optimum Tx setting, controller 120 retrieves the optimum Tx setting from Table 2, and tunes curve 153, so that peak 162 is positioned at the frequency corresponding to the current Tx channel or group of channels and the current temperature. Advantageously, the antenna efficiency is improved in the current Tx channel when improved Tx efficiency is necessary. In such a case, the Rx antenna efficiency will be degraded, but this occurs at a time when Rx antenna efficiency is not needed. As described above, the optimum Tx matching circuit efficiency is selected only when the reverse link (transmission from the mobile station) is doing poorly and the forward link (reception a the mobile station) is doing well. The reverse link and the forward link are rebalanced at least to some extent. System resources are more optimally utilized.

As described above with respect to Table 3, if the reverse link is doing well and the forward link is doing poorly, an optimum Rx matching circuit setting will be selected from Table 3. Matching circuit 104 is tuned to move peak 162 of curve 153 to the frequency of the current Rx channel or group of channels.

As described above with respect to Table 4, if a shift in matching circuit setting is called for other than an optimum Tx or Rx setting, then a matching circuit setting will be selected from Table 4. Controller 120 keeps track of which bin the matching circuit setting is currently in. Then, when controller 120 calls for a shift based on Table 4, controller 120 looks up the new matching circuit setting in Table 4, based on the current bin, the number of bins to move and the direction (Tx or Rx). For example, if the current matching circuit setting is 0.13 Volts, that is, bin number 2, and Table 1 calls for a shift of 2 bins toward Rx (or Tx) then controller 120 will look up bin 4 (start at bin 2 and add 2 bins for the selected 2 bin shift) and find the matching circuit setting corresponding to bin 4, which in this case is 0.38 Volts. Controller 120 will tune matching circuit 104 by applying 0.38 Volts to matching circuit 104, thereby moving curve 153 two bins toward the Rx frequencies.

Figure 3:
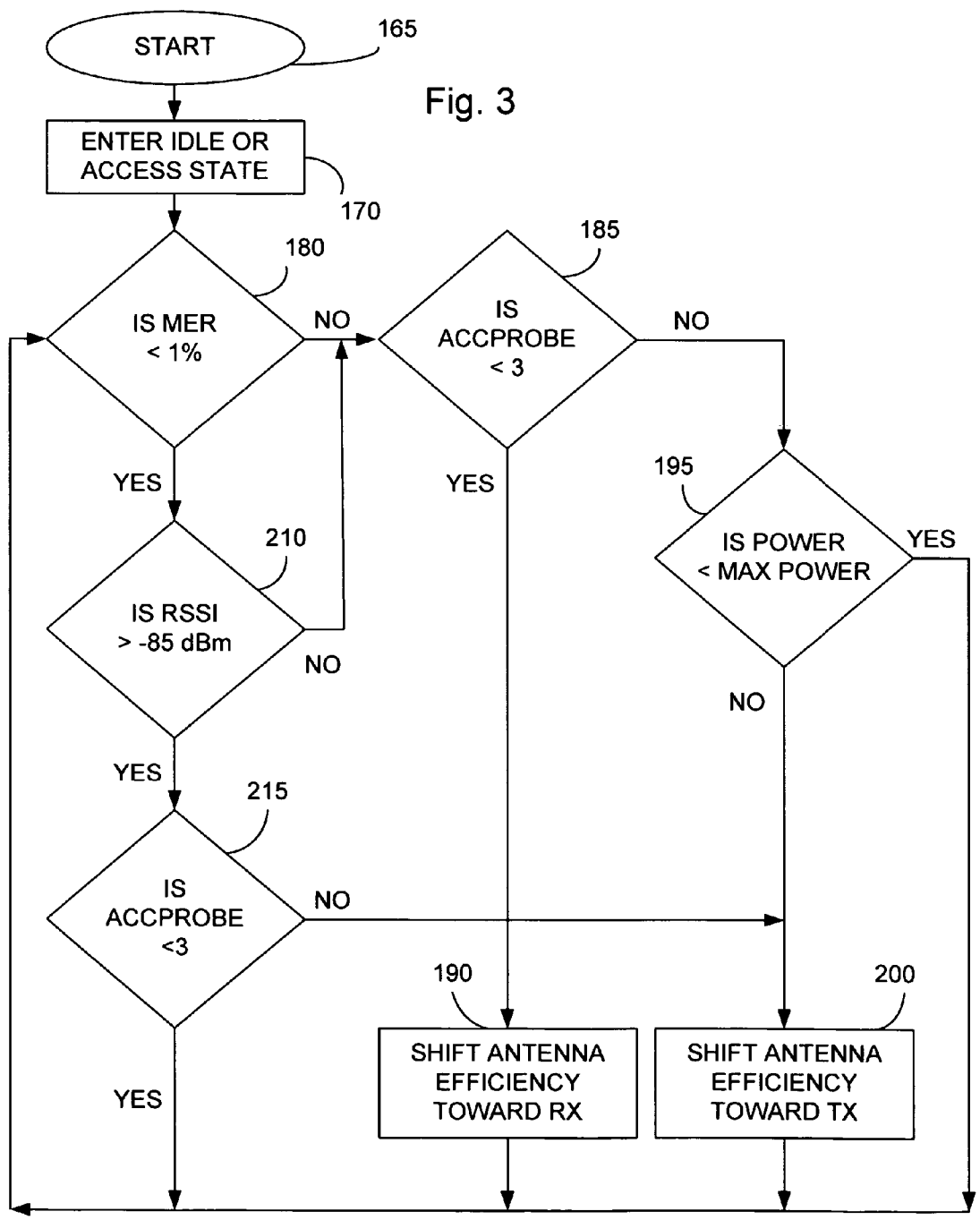
FIG. 3 is a flow chart illustrating a method for tuning an antenna efficiency responsive to a receive signal quality indicator.

FIG. 3 is a flow chart illustrating a method for tuning an antenna efficiency (such as curve 153 in FIG. 2) responsive to a received signal quality indicator, such as RSSI and MER. The method starts in step 165. In step 170, the mobile station enters an idle or access state. In idle state the mobile station has registered with a base station but is not sending or receiving data (which may be voice data or other data) to or from the base station, except that the mobile station monitors overhead channels, such as a paging channel. In access state, the mobile station is attempted to establish a traffic channel with a base station. The mobile station sends access probes to the base station. After each access probe, the mobile station waits a predetermined time for a response from the base station. After the mobile station waits the predetermined time, if the mobile station has not received a response from the base station, the mobile station sends another access probe at a higher power level.

In decision step 180, the mobile station determines whether a first received signal quality indicator, MER, is less than a threshold, such as one percent. If not, then the mobile station determines whether the number of access probes, shown as ACCPROBE in decision step 185, is less than a threshold, such as three. In idle state, the number of access probes is zero, so the answer to decision step 185 is always yes in idle state. In access state, the number of access probes may be any integer value from zero to a maximum value, such as five.

If the number of access probes is below the threshold in step 185, then the antenna efficiency is shifted toward Rx frequency, as shown in step 190. Advantageously, the quality of the forward link is improved, thereby improving the efficiency of network resource use. If not, then the present power level is compared to the maximum power, in decision step 195. If the present power level is equal to or greater than the maximum power, then the antenna efficiency is shifted toward the Tx frequency, in step 200. Advantageously, this permits some connections to be made that would not otherwise be possible. For example, at the edge of coverage, a customer may be able to make a call that otherwise would not go through. But if the present power is less than the maximum power, the antenna efficiency does not need to be shifted.

Returning to the discussion of step 180, if MER is less than one percent, then the next step is decision step 210, in which it is determined whether the RSSI is less than −85 dBm. If not, then the next step is step 185, which was discussed above. In other words, if either MER or RSSI is worse than a predetermined threshold, then the method continues at step 185.

But if the RSSI is less than −85 dBm, then the next step is decision step 215, in which it is determined whether the number of access probes is less than a predetermined threshold, such as three. Step 215 is similar to step 185, except that at step 215, it has been determined that the received signal quality indicators, MER and RSSI, are better than their respective predetermined thresholds. Thus, there is not need to either shift the antenna efficiency toward Rx frequencies or check whether the present power is equal to or greater than the maximum power. Instead, if the access probe number threshold has been met, the antenna efficiency is shifted toward the Tx frequencies, in step 200. If not, then the method returns to step 180.

The shifting of antenna efficiency of steps 190 and 200 can be accomplished by any convenient means, such as, for example, by employing a table like Table 4 for both of steps 190 and 200, or a table like Table 2 for step 200 and a table like Table 3 for step 190. Thus, the method described with respect to FIG. 3 may be accomplished using Table 4 and without Tables 2-3. Alternatively, even Table 4 may be avoided if, for example, the matching circuit settings are all equally spaced. Then, the shift steps 190 and 200 may be accomplished without Table 4, merely by changing the matching circuit setting by a predetermined amount in either the Tx or the Rx direction. For example, responsive to steps 190, 0.1 Volt may be added to the current matching circuit setting, while, responsive to step 200, 0.1 Volt may be subtracted from the current matching circuit setting.

While MER and RSSI are shown in FIG. 3, any received signal quality indicator can be used. Further, the method may include only one received signal quality indicator, such as MER or RSSI, or another received signal quality indicator. For example, symbol error rate (SER) can be used. But if SER is used in a system such as TIA/EIA IS-95 or IS-2000, then the gain of the decoder will not be accounted for.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A method for tuning a wireless communication device antenna matching circuit, the method comprising the steps of:
    sending a first access probe at a first transmit power level to a base station;
    receiving a receive signal quality indicator;
    comparing the receive signal quality indicator with a predetermined threshold to determine whether a first condition is satisfied, wherein the first condition is satisfied if the receive signal quality is below the predetermined threshold, the first condition is not satisfied if the receive signal quality is above the predetermined threshold;
    comparing a number of access probes with a threshold number to determine whether a second condition is satisfied, where the number of access probes is an integer value from zero to a predetermined value, the access probes performed by the wireless communication device, wherein the second condition is satisfied if the number of access probes is below the threshold number, the second condition is not satisfied if the number of access probes is above the threshold number; and
    adjusting an impedance match of the antenna matching circuit by performing at least one of:
        shifting an antenna efficiency toward a receive frequency if the first condition is not satisfied and the second condition is satisfied, and
        shifting the antenna efficiency toward a transmit frequency if a first state or a second state exists, said first state exists if the first condition is not satisfied, the second condition is not satisfied, and a transmit power is greater than a maximum transmit power, said second state exists if the first condition is satisfied and the second condition is not satisfied.

2. The method of claim 1, wherein the receive signal quality indicator is a message error rate.

3. The method of claim 2, wherein the message error rate is on a paging channel.

4. The method of claim 1, wherein the receive signal quality indicator is a receive signal strength indicator.

5. The method of claim 4, further comprising the step of:
    determining that a second receive signal quality indicator is below a second predetermined threshold, and wherein the step of adjusting is also responsive to the step of determining that a second receive signal quality indicator is below a second predetermined threshold.

6. The method of claim 4, wherein the step of comparing includes the step of determining that the receive signal strength indicator is below the threshold.

7. The method of claim 1, further comprising the step of:
    sending at least two access probes and wherein the step of adjusting comprises shifting an antenna efficiency toward a the transmit frequency, a second access probe being sent at a second transmit power level to the base station if the wireless communication device fails to receive a response from the base station after a predetermined time from the sending of the first access probe, wherein the second power level is higher than the first power level.

8. The method of claim 1, further comprising the step of:
    determining that no more than one access probe has been sent in a present access probe series and wherein the step of adjusting comprises the step of shifting an antenna efficiency toward the receive frequency.

9. A wireless communication device comprising:
    an antenna;
    a tunable antenna matching circuit connected to the antenna; and
    a base band processor connected to the tunable antenna matching circuit, the base band processor configured to receive a receive signal quality indicator the base band processor further configured to tune the antenna matching circuit by performing at least one of:
        shifting an antenna efficiency toward a receive frequency if a first condition is not satisfied and a second condition is satisfied, and shifting the antenna efficiency toward a transmit frequency if a first state or a second state exists, said first state exists if the first condition is not satisfied, the second condition is not satisfied, and a transmit power is equal to or greater than a maximum transmit power, said second state exists if the first condition is satisfied and the second condition is not satisfied, wherein the first condition pertains to a comparison between the signal quality indicator and a predetermined threshold wherein the first condition is satisfied if the receive signal quality is below the predetermined threshold, the first condition is not satisfied if the receive signal quality is above the predetermined threshold, and the second condition pertains to a comparison between a number of access probes and a threshold number, the access probes performed by the wireless communication device, where the number of access probes is an integer value from zero to a predetermined value, wherein the second condition is satisfied if the number of access robes is below the threshold number, the second condition is not satisfied if the number of access probes is above the threshold number.

10. The wireless communication device of claim 9, further comprising:

a memory storing a table, the table comprising frequency bin identifiers and corresponding tunable antenna matching circuit settings, and wherein the processor is configured to look up the frequency bin identifiers in the table and tune the antenna matching circuit to the corresponding tunable antenna matching circuit settings.

11. The wireless communication device of claim 9, further comprising:

a memory storing a table, the table comprising received signal strength indicia and corresponding tunable antenna matching circuit settings, and wherein the processor is configured to look up the received signal strength indicia in the table and tune the antenna matching circuit to the corresponding tunable antenna matching circuit settings.

12. The wireless communication device of claim 9, further comprising:

a memory storing a table, the table comprising message error rate indicia and corresponding tunable antenna matching circuit settings, and wherein the processor is configured to look up the message error rate indicia in the table and tune the antenna matching circuit to the corresponding tunable antenna matching circuit settings.

13. A wireless communication device comprising:

a radiating means for radiating electromagnetic signals;

a tunable impedance matching means for tuning an impedance match of the radiating means, the tunable impedance matching means connected to the radiating means; and a processing means for processing base band signals connected to the tunable impedance matching means, the processing means configured to receive a receive signal quality indicator, the processing means further configured to tune the tunable impedance matching means by performing at least one of:

shifting an antenna efficiency toward a receive frequency if a first condition is not satisfied and a second condition is satisfied, and shifting the antenna efficiency toward a transmit frequency if a first state or a second state exists, said first state exists if the first condition is not satisfied, the second condition is not satisfied, and a transmit power is equal to or greater than a maximum transmit power, said second state exists if the first condition is satisfied and the second condition is not satisfied, wherein the first condition pertains to a comparison between the signal quality indicator and a predetermined threshold, wherein the first condition is satisfied if the receive signal quality is below the predetermined threshold, the first condition is not satisfied if the receive signal quality is above the predetermined threshold, and the second condition pertains to a comparison between a number of access probes and a threshold number, the access probes performed by the wireless communication device, where the number of access probes is an integer value from zero to a predetermined value, wherein the second condition is satisfied if the number of access robes is below the threshold number, the second condition is not satisfied if the number of access probes is above the threshold number.

14. The wireless communication device of claim 13, further comprising:

a memory means for storing a table, the table comprising receive signal quality indicators and corresponding tunable impedance matching means settings, and wherein the processing means is configured to look up the receive signal quality indicators in the table and tune the tunable impedance matching means to the corresponding tunable impedance matching means settings.

15. The wireless communication device of claim 13, further comprising:

a memory means for storing a table, the table comprising received signal strength indicia and corresponding tunable impedance matching means settings, and wherein the processing means is configured to look up the received signal strength indicia in the table and tune the tunable impedance matching means to the corresponding tunable impedance matching means settings.

16. The wireless communication device of claim 13, further comprising:

a memory means for storing a table, the table comprising message error rate indicia and corresponding tunable impedance matching means settings, and wherein the processing means is configured to look up the message error rate indicia in the table and tune the tunable impedance matching means to the corresponding tunable impedance matching means settings.

* * * * *